(12) United States Patent
Disch et al.

(10) Patent No.: US 11,988,130 B2
(45) Date of Patent: May 21, 2024

(54) METHOD FOR OPERATING AN EXHAUST BURNER, DEVICE FOR EXECUTING SUCH A METHOD, AND MOTOR VEHICLE

(71) Applicant: Robert Bosch GmbH, Stuttgart (DE)

(72) Inventors: Christian Disch, Wimsheim (DE); Max Braunbeck, Lauffen am Neckar (DE); William Krein, Neckarzimmern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/344,717

(22) Filed: Jun. 29, 2023

(65) Prior Publication Data

US 2024/0003279 A1   Jan. 4, 2024

(30) Foreign Application Priority Data

Jul. 4, 2022  (DE) ..................... 10 2022 206 801.7

(51) Int. Cl.
| | |
|---|---|
| *F01N 3/20* | (2006.01) |
| *F01N 3/025* | (2006.01) |
| *F01N 3/22* | (2006.01) |
| *F01N 9/00* | (2006.01) |

(52) U.S. Cl.
CPC .......... *F01N 3/2033* (2013.01); *F01N 3/025* (2013.01); *F01N 3/22* (2013.01); *F01N 3/225* (2013.01); *F01N 9/00* (2013.01); *F01N 3/0256* (2013.01); *F01N 2240/14* (2013.01); *F01N 2430/06* (2013.01); *F01N 2550/14* (2013.01); *F01N 2610/03* (2013.01); *Y02T 10/12* (2013.01)

(58) Field of Classification Search
CPC .......... F01N 3/2033; F01N 3/025; F01N 3/22; F01N 3/225; F01N 9/00; F01N 2240/14; F01N 2430/06; F01N 2550/14; F01N 2610/03; F01N 1/14; F01N 2240/16; F01N 3/0253; F01N 3/0256; Y02T 10/12
See application file for complete search history.

(56) References Cited

U.S. PATENT DOCUMENTS

2014/0311458 A1*  10/2014  Tsumagari ................ F01N 3/18
                                                                   123/478

FOREIGN PATENT DOCUMENTS

| DE | 4132814 A1 | 4/1993 |
|---|---|---|
| DE | 19504208 A1 | 8/1995 |

* cited by examiner

*Primary Examiner* — Brandon D Lee
(74) *Attorney, Agent, or Firm* — NORTON ROSE FULBRIGHT US LLP; Gerard A. Messina

(57) ABSTRACT

A method for operating an exhaust burner, which is situated in an exhaust system downstream from an internal combustion engine of a motor vehicle. Prior to and during a start phase of the exhaust burner, an air-mass flow supplied to a combustion chamber of the exhaust burner is increased, in particular in a strictly monotonical manner, between a start time in a starting air-mass flow and a further time in a further air-mass flow. Prior to the further time, fuel is supplied to the combustion chamber. A fuel-air mixture is produced in the combustion chamber from the fuel and air of the air-mass flow. The fuel-air mixture is ignited with the aid of an ignition device which is continuously hot or forms ignition sparks intermittently.

15 Claims, 7 Drawing Sheets

METHOD FOR OPERATING AN EXHAUST BURNER, DEVICE FOR EXECUTING SUCH A METHOD, AND MOTOR VEHICLE

FIELD

The present invention relates to a method for operating an exhaust burner. In addition, the present invention relates to a device for executing such a method and to a motor vehicle.

BACKGROUND INFORMATION

To satisfy legally mandated emission limit values, three-way catalysts (TWC) may be used, which make it possible to convert the relevant gaseous pollutants NOx, HC as well as CO into harmless products such as N2, H2O and CO2. To ensure that these catalytic reactions take place as intended, the temperatures in the catalytic converter usually must exceed what is known as the light-off temperature of typically 300-400° C. As soon as this temperature is reached or exceeded, (known as the catalytic window), the catalytic converter virtually completely converts the relevant pollutants.

To reach this state as quickly as possible, so-called engine-internal catalytic heating measures may be used. In the process, the efficiency of the gasoline engine is worsened by retarded ignition angles, and the exhaust-gas temperature and the enthalpy introduction into the catalytic converter are increased in this way. Through adapted injection strategies (e.g., multi-injections), the combustion stability is able to be ensured at the same time.

Apart from these engine-internal catalytic converter heating measures, it is also possible to utilize external catalytic converter heating measures, for instance using electrically heatable catalytic converters or exhaust burners. Such external heating measures are described in German Patent No. DE 41 32 814 A1 and German Patent Application No. DE 195 04 208 A1, for instance. To lower emissions even further in comparison with a conventional operation featuring engine-internal heating measures, especially when starting with a cold engine, i.e., high loading of the internal combustion engine in a cold state without an idling phase, so-called CAT burners for accelerating the TWC light-offs have shown to be an extremely effective measure.

SUMMARY

The problem on which the present invention is based is solved by a method for operating an exhaust burner, which is situated in an exhaust system downstream from an internal combustion engine of a motor vehicle, prior to and during a start phase of the exhaust burner. According to an example embodiment of the present invention, an air-mass flow supplied to the combustion chamber of the exhaust burner is increased, in particular in a strictly monotonical manner, between a start time in a starting air-mass flow, and
a further time in a further air-mass flow.
Prior to the further time,
fuel is supplied to the combustion chamber,
a fuel-air mixture is created in the combustion chamber from the fuel and air of the air-mass flow, and
the fuel-air mixture is ignited with the aid of an ignition device which is continuously hot or produces an ignition spark intermittently.

In the start phase, for example, it may be provided that no firing of the internal combustion engine takes place. However, in the start phase, the combustion engine may also be in a running operation already or be started in parallel in terms of time.

The present method allows for a rapid and simultaneously emission-minimized start by a specification/procedure (time-based or event-based) of an air supply and air metering, a fuel supply and fuel metering, a frequency change of the injection and ignition, and the adaptation of the injection pressure.

In this context and thereafter, the terms air-mass flow and volumetric flow are used interchangeably because a change in the air-mass flow goes hand in hand with a change in the volumetric (air) flow.

The continuously hot ignition device used during a start phase of the exhaust burner may particularly be a glow plug, which offers the special advantages that
the exhaust burner may already be started without a plateau having been reached for the air-mass flow or the volumetric flow, and/or
the exhaust burner can be started in any air-mass flow or volumetric flow, and/or
the exhaust burner can be started in any gradient of the volumetric flow.

The absolute fastest possible start is achieved as a result, which thus induces the lowest emissions and the greatest heat output.

According to an example embodiment of the present invention, the fuel may particularly be gasoline and needs to be supplied to the exhaust burner only in the start phase and after the runup of the secondary air pump. To that extent, the gasoline may be conveyed to the already heated glow plug (after its energization) for the first time at a start-of-injection time that occurs after a maximum value of the air-mass flow has been reached. The energizing of the glow plug may take place as soon as a vehicle intelligence has ascertained the request of the vehicle driver for starting the drive. The energizing of the glow plug may therefore be carried out in a time context with or even at the same time as the energization or preheating of the lambda probe.

According to an example embodiment of the present invention, to prevent unburnt fuel from being "flushed out" already when the supply of the air-mass flow into the combustion chamber commences, the fuel may be conveyed to the combustion chamber only after the start time so that it is provided that the fuel is supplied to the exhaust burner at a start-of-injection time, which lies between the start time and a first time, in particular the further time.

According to an example embodiment of the present invention, to achieve satisfactory mixing of the fuel and air and to adapt it to the temperature rising during the start phase, it may be provided that the fuel is injected into a combustion chamber of the exhaust burner with the aid of an injection valve at an injection frequency, and that fuel is injected at the start-of-injection time at a first injection frequency and at a second injection frequency at the first time.

On the other hand, according to an example embodiment of the present invention, to minimize the control effort, the injection frequency may be kept constant during a time period from the start-of-injection time until the first time. However, to reduce the emissions even further and to adapt the injection frequency to the current state of the start phase, it may alternatively also be provided that the injection frequency is steadily increased during a time period from the start-of-injection time until the first time. In an alternative embodiment, it may also be provided that the injection frequency is steadily reduced beginning with the start-of-injection time up to the first time.

When a constantly hot glow plug is used to ignite the fuel-air mixture, its control software does not need any rasterization in the millisecond range because the glow plug is not ignited in a clocked manner. In view of this, a software for controlling the injection frequency from the start-of-injection time until the second time likewise does not require an adaptation to a rasterization for controlling the ignition of the fuel-air mixture. It is therefore possible to keep the injection frequency very low. For example, the first injection frequency at the start-of-injection time up to the first time may lie at 200 Hz. To reduce audible noise, i.e., caused by the 'noise vibration harshness' (NVH), the second injection frequency may be reduced starting with the first time, in particular to 180 Hz. The air-fuel ratio, too, is able to be adapted to the current state of the start phase. To that extent, it may be provided that an air-fuel ratio is steadily increased in a stepwise or continual manner from the start-of-injection time to the first time, so that, beginning with a first air-fuel ratio for the start-of-injection time, a higher second air-fuel ratio is achieved at the first time. In an alternative embodiment, the air-fuel mixture ratio may also be adapted in such a way that it is steadily reduced beginning with the start-of-injection time until the first time.

According to an example embodiment of the present invention, to achieve an uninterrupted low-emission operation as soon as possible even in the start phase, it may be provided that the second air-fuel ratio is kept constant up to a second time, a time period from the start time to the further time being shorter than a time period from the first time to the second time. Similarly, the air-mass flow may also be kept constant starting with the further time up to a second time, a time period from the start time to the further time being shorter than a time period from the first time to the second time.

To consider the disadvantageous effect of the wall film, which may initially form during the start phase, according to an example embodiment of the present invention, it may be provided that the combustion chamber is supplied with a quantity of the fuel during a time period from the start-of-injection time to the first time, and that the air-fuel ratio is initially understoichiometric and then overstoichiometric.

According to an example embodiment of the present invention, to enable a transition from an understoichiometric fuel-air ratio to an overstoichiometric air-fuel ratio, it may be provided that an injection period for a variation of the air-fuel ratio is varied with the aid of an enrichment factor and that a further time period lies in a time period between the time periods featuring an understoichiometric and overstoichiometric air-fuel ratio, during which a stoichiometric air-fuel ratio is specified in that at least one injection process is omitted by setting the enrichment factor for this injection process to zero.

According to an example embodiment of the present invention, to enable a rapid start of the motor vehicle for the driver, the exhaust burner should be brought into an operative state as quickly as possible. In this respect, the present method may be carried out as a function of a specified request by the driver of the motor vehicle for a startup of the internal combustion engine. A lambda probe of the exhaust system may be heated and/or the ignition device, which is a glow plug for this purpose, may be heated as a function of a specification of such a request. Especially preferably, both the lambda probe and the glow plug are heated. Different heating times may be considered in the process.

The present invention also relates to a device for executing the afore-described method. For this purpose, the device includes a gasoline engine and an exhaust system provided with an exhaust burner. The exhaust burner includes a combustion chamber and a glow plug, which may be used to ignite a fuel-air mixture within the combustion chamber of the exhaust burner.

In addition, the present invention relates to a motor vehicle equipped with such a device.

Additional features, application possibilities and advantages of the present invention result from the following description of exemplary embodiments of the present invention, which are described with the aid of the figures.

DETAILED DESCRIPTION OF EXAMPLE EMBODIMENTS

Figure 1:
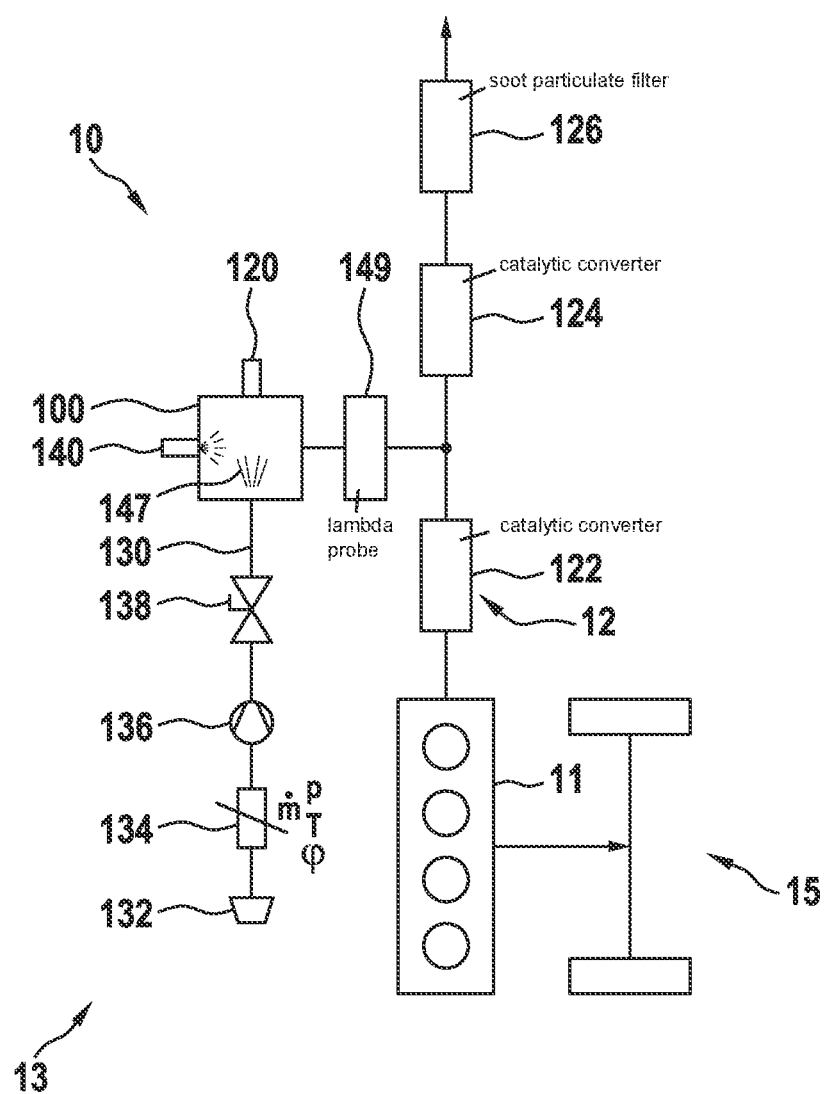
FIG. 1 shows schematically, a motor vehicle having an exhaust burner.

In FIG. 1, a motor vehicle 10 is illustrated schematically. Motor vehicle 10 includes a drivetrain 15 having an internal combustion engine 11, which is developed as a gasoline engine, in particular. As an alternative, however, it is possible to develop internal combustion engine 11 as some other type of engine having externally supplied ignition, which especially is operated using gasoline. The motor vehicle furthermore includes an exhaust system 12. In the following text, based on FIGS. 1 to 10, exhaust system 12 for the gasoline engine is predominantly described as a combustion engine 11.

Exhaust system 12 is developed for the aftertreatment of an exhaust gas generated by internal combustion engine 11 and includes two catalytic converters 122, 124 and a soot particulate filter 126 for this purpose. Provided in addition are exhaust burner 100 for heating at least part of exhaust system 12, as well as an associated secondary air system 13, which is designed to supply air 147 to exhaust burner 100 and to enable and promote oxidation reactions. Secondary air system 13 includes an air filter 132, a secondary air pump 134 following downstream, and an air-mass meter 136 following downstream, which considers pressure p and temperature T. Air-mass meter 136 may be developed as a hot-film air-mass meter (HFM), which is also able to measure humidity φ. In addition, secondary air system 14 has a secondary air valve 138, which may be provided in the form of a blocking valve, for example, and is able to prevent or allow an air supply 130 from secondary air system 13 into exhaust burner 100. Hot exhaust gases generated by exhaust burner 100 in the manner described in the following text are able to be conveyed to exhaust system 12, a flow path leading there extending along a lambda probe 149. The hot exhaust gases, whose residual oxygen content was detected by lambda probe 149, are able to be fed into exhaust train 12, in particular between the two catalytic converters 122, 124.

Figure 2:
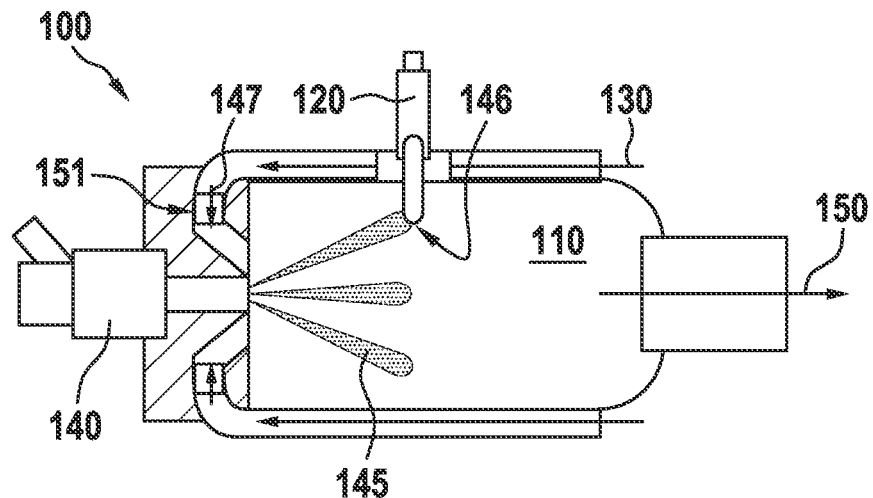
FIG. 2 shows schematically, the exhaust burner from FIG. 1, which includes a combustion chamber.

FIG. 2 schematically depicts exhaust burner 100. Exhaust burner 100 includes a combustion chamber 110, an ignition device 120, air supply 130, which is supplied by the secondary air pump, and an injection valve 140. Fuel 145 introduced into combustion chamber 110 is gasoline. A swirl screen 151 is situated in a channel of air supply 130. When exhaust burner 100 is in operation, the gasoline together with air 147 introduced via swirl screen 151 is brought to a reaction with the aid of ignition device 120, in the process of which hot exhaust gases 150 are produced which are utilized to heat the components situated downstream from exhaust burner 100 and which involve one of the two catalytic converters and the soot particulate filter. The gasoline is injected directly into combustion chamber 110 with the aid of a direct injection. In this regard, one feature of this design of exhaust burner 100 is the direct injection of fuel 145 into combustion chamber 110 and the related interaction with ignition device 120. Ignition device 120 is preferably a glow plug, which means that a continually hot surface and thus an ignition possibility is provided. In an alternative embodiment, however, ignition device 120 may also have a sparkplug so that an intermittent ignition takes place.

Based on an overall view of FIG. 2 and FIG. 3 described hereinafter, it is shown in the following text that during a start phase 148 of exhaust burner 100, an air-mass flow ṁ supplied to combustion chamber 110 is continuously increased, in particular in a strictly monotonic manner, between a start time t0 at a starting air-mass flow ṁ0 and
at a further time t1 at a further air-mass flow ṁ1, and prior to the further time t1,
fuel 145 is conveyed to combustion chamber 110,
a fuel-air mixture 146 is produced in combustion chamber 110 from fuel 145 and air 147 of air-mass flow ṁ, and
fuel-air mixture 146 is ignited with the aid of ignition device 120, which is continuously hot or forms an ignition spark intermittently.

Figure 3:
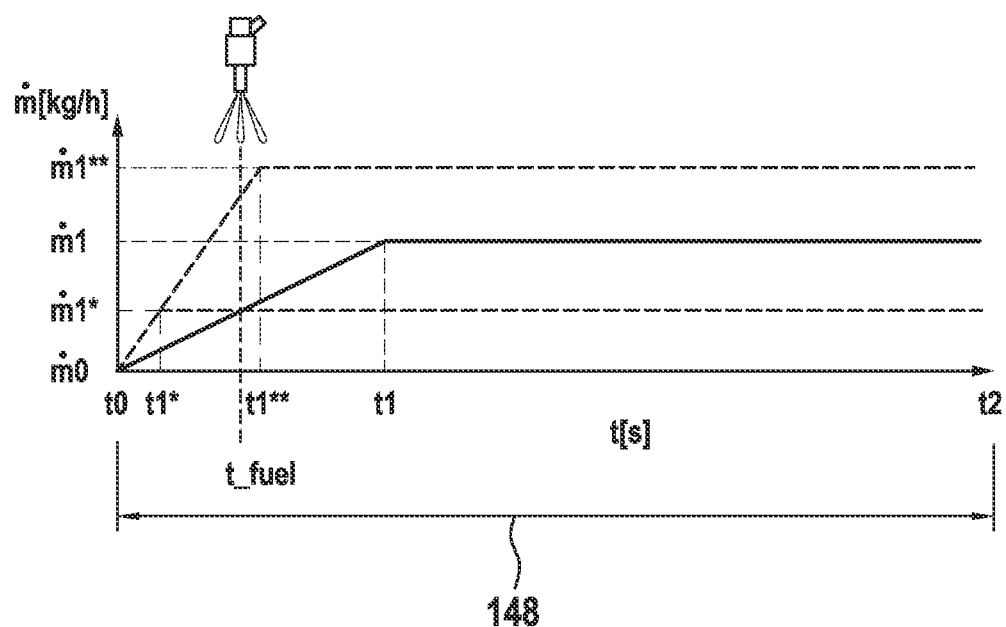
FIG. 3 shows a schematic diagram, which represents a curve of an air-mass flow of air supplied to the combustion chamber from FIG. 2 over the time, the associated internal combustion engine being developed as a gasoline engine.

FIG. 3 shows a time characteristic of an air supply and air metering. Based on a diagram, FIG. 3 therefore shows the characteristic of air-mass flow ṁ of the air supplied to the combustion chamber from FIG. 2 over time t. Air-mass flow ṁ has been plotted in kg/h on the ordinate. Time t is plotted in seconds on the abscissa. A sequentially executed method for starting the exhaust burner will be described in the following text.

The method begins at a start time t0 when a request of the vehicle driver for an operation of the gasoline engine is already known. The supply of air is increased starting from a volumetric flow V0 of zero. At a first time t1, a first volumetric flow V1 is reached, which is greater than volumetric flow V0 of zero. First volumetric flow V1 is predefined by a setpoint value of the output at a first time t1. The increase in volumetric flow V is defined by the gradient from start time t0 until first volumetric flow V1 is reached at first time t1. This gradient is a function of the system and may particularly depend on an output of the secondary air pump, and/or
one or more line length(s), and/or
one or more line cross-section(s), and/or
one or more additional flow resistance(s), and/or
a temperature, in particular an external temperature, and/or the temperature of the exhaust burner, and/or
a humidity of the air and/or the gasoline, and/or
an altitude or air pressure.

After the setpoint value of the output has been reached at time t1, volumetric flow V is kept constant at the level of first volumetric flow V1. The holding time toward this goal ends at the earliest at a second time t2. A time period between start time t0 to second time t2 is merely a time period for start phase 148 and thus not the entire runtime of the exhaust burner. A time period t1-t0 from start time t0 to first time t1 is shorter than a time period t2-t1 from first time t1 to second time t2.

In the diagram, two further alternative characteristics of volumetric flow V over time t have been plotted with the aid of dashed lines. In the first alternative, a first volumetric flow V1* is reached at a first time t1*. In the second alternative, a first volumetric flow V1 is reached at a first time t1. Volumetric flow V1* of the first alternative is smaller than first volumetric flow V1** of the second alternative. Time t1* of the first alternative is reached earlier than first time t1** of the second alternative.

The two alternatively sketched characteristics featuring the two first volumetric flows V1* and V1**, which reach their setpoint value at the two first times t1* and t1**, are meant to illustrate that an ignition mechanism does not depend on a target load or a gradient of the volumetric flow V of the air.

In a first embodiment of the present method according to the diagram of FIG. 3, an intermittent injection may be started at a start-of-injection time t_fuel, which lies between start time t0 and first time t1. If a glow plug is used as a continually hot surface for the ignition of the fuel-air mixture, then the glow plug is already heated before start-of-injection time t_fuel so that it ignites the fuel-air mixture at an ignitable mixture ratio already at the first contact. This pre-glowing can also be gathered from FIG. 11 which, however, will be described only toward the end of the description.

To improve the robustness in start phase 148 of the exhaust burner, it may be advantageous to carry out the method according to the diagram in FIG. 3 in a second embodiment. In this second embodiment, the injection of fuel takes place directly after the request for starting the exhaust burner becomes known. If necessary, this early injection of fuel may even be undertaken already at start time t0 when the starting volumetric flow amounts to V0=0 or the starting air-mass flow amounts to 0 kg/h. In other words, the injection of fuel begins without an airflow.

Figure 4:
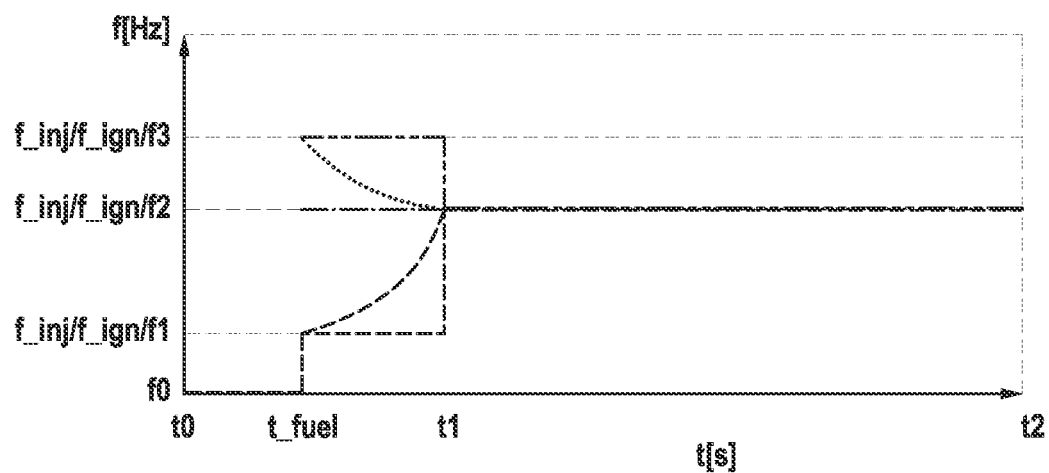
FIG. 4 shows a schematic diagram according to the diagram of FIG. 3, in which an injection frequency and an ignition frequency of fuel are shown in addition, a change of an ignition frequency or an injection frequency over the time being depicted under the condition of an intermittent use.

It can be gathered from FIG. 4 that an injection frequency f_inj is set to a first injection frequency f1 at start-of-injection time t_fuel at the latest. Injection frequency f_inj is then modified to a second injection frequency f2 at the following first time t1.

This modification of injection frequency f_inj may be undertaken both in multiple stages and on a continual basis. For illustration purposes, a dashed line which represents an increase in injection frequency f_inj in two stages is shown in FIG. 4. In addition, an alternative adaption of injection frequency f_inj is shown with the aid of a likewise dashed curve. The curve represents a continuous increase of injection frequency f_inj from first injection frequency f1 to second injection frequency f2.

In both alternative embodiments according to FIG. 4, it is provided that during the start while the runup of the pump is taking place, that is, between first start time t0 and first time t1, first injection frequency f1 differs from second injection frequency f2 at which the exhaust burner is operated in a stationary mode at a time t>t1.

In a further, simplified exemplary embodiment, the first injection frequency f1 may be kept constant from start-of-injection time t_fuel to second time t2 so that no change in injection frequency f_inj is required.

An adaptation of an ignition frequency f_ign comparable to the adaption of injection frequency f_inj is required only if the exhaust burner is operated using an intermittent ignition, for instance with the aid of a sparkplug instead of the preferred glow plug. In that regard, the indications f0, f1 and f2 according to the diagram of FIG. 4 may also be transferred to an ignition frequency of a sparkplug which is operated at ignition frequency f_ign. The ordinate of the diagram according to FIG. 4 thus relates to ignition frequency f_ign and also to injection frequency f_inj, both frequencies being measured in Hertz (Hz).

To the extent that an intermittent ignition takes place, however, injection frequency f_inj and ignition frequency f_ign may also be adapted independently of each other. This means that $f\_inj \neq f\_ign$.

In addition, two further alternative embodiments may be gathered from FIG. 4. In these alternative embodiments it is provided that starting from a start-of-injection time t_fuel featuring a first injection frequency, which hereinafter is denoted by f3 for the purpose of distinction, injection frequency f is steadily decreased, or decreased in stages, up to first time t1, to second injection frequency f2.

In a further embodiment, it is possible that multiple ignitions take place during each injection and also that an ignition is implemented only for each $x^{th}$ injection.

As a result, injection frequency f_inj and ignition frequency f_ign may be unequal. This also includes embodiments in which injection frequency at start time t0 is f_inj=0 Hz. In other words, no fuel is injected. In this context, ignition frequency f_ign may be operated independently of injection frequency f_inj, in which case f_ign>f0 and f0=0 Hz.

Figure 5:
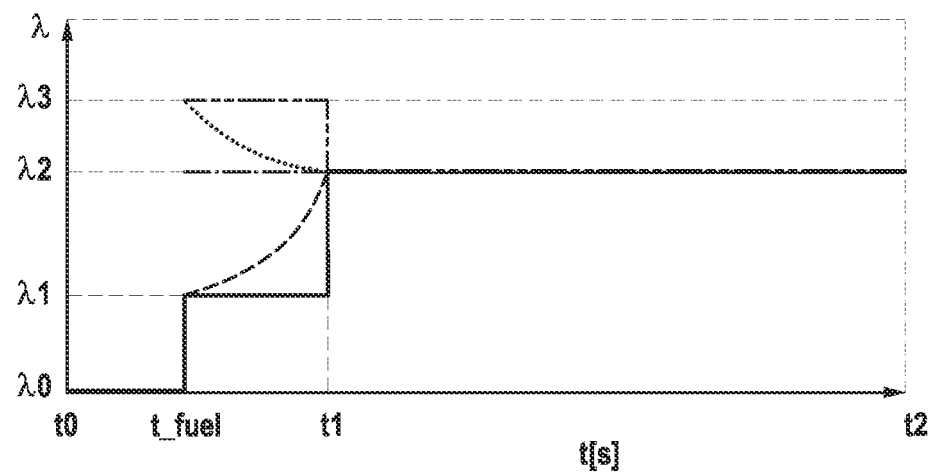
FIG. 5 shows a schematic diagram of an air-fuel ratio $\lambda$ over the time.

In FIG. 5, a specification of the air-fuel ratio λ has been plotted over time t with the aid of a diagram. The scaling of time t on the abscissa is adapted to the abscissa of FIGS. 3 and 4 so that times t0, t_fuel, t1, t2 correspond to the similarly denoted times t0, t_fuel, t1, t2 of FIGS. 3 and 4. The specification of air-fuel ratio λ is adapted to a first air-fuel ratio λ1 at the latest at start-of-injection time t_fuel. An air-fuel ratio initial value λ0 is of no relevance because the injection process is enabled at the earliest at start-of-injection time t_fuel using the injection frequency f_inj=f1. Considered in absolute terms, first air-fuel ratio λ1 may be understoichiometric, stoichiometric or also overstoichiometric. In addition to second injection frequency f2, the specification for the air-fuel ratio λ is also adapted at first time t1 from first air-fuel ratio λ1 to a second air-fuel ratio λ2. Second air-fuel ratio λ2 is greater than first air-fuel ratio λ1, that is, λ2>λ1.

As an alternative and if air-fuel ratio λ is overstoichiometric between start-of-injection time t_fuel and the first time, then second air-fuel ratio λ2 may be smaller than the first air-fuel ratio, which is therefore denoted by λ3 (instead of λ1) in FIG. 5, or in other words, λ2<λ3. Thus, in the event that air-fuel ratio λ in the start phase is clearly overstoichiometric, the change to λ2 may also mean that λ2<λ3. That makes it possible to achieve especially satisfactory emission values.

The air-fuel ratio λ may therefore be modified both in multiple stages and continually. For illustrative purposes, a solid line, for one, is shown in the diagram of FIG. 5, which represents an increase in the air-fuel ratio λ in two stages. In addition, an alternative adaptation of the air-fuel ratio λ is shown by a dashed curve. The curve represents a continual increase in the air-fuel ratio λ from first air-fuel ratio λ1 to second air-fuel ratio λ2. In alternative embodiments, it may also be provided that beginning with the start-of-injection time t_fuel until first time t1, the air-fuel ratio λ is reduced continually or in stages. To simplify the control effort, the first air-fuel ratio λ1 is also able to be kept constant from start-of-injection time t_fuel to second time t2 so that no change in the air-fuel ratio λ is necessary.

As a result of possible wall film formations, fuel is deposited on the surface of the combustion chamber during the starting process of the exhaust burner. Because of the wall film, it may happen that the predefined air-fuel ratio λ is possibly not reached exactly according to the specification (precontrol). The fuel portion that forms the wall film thus participates in the combustion with a delay. This results in a deviation from the specification of the air-fuel ratio λ. A number of x injections is provided with an enrichment factor A for this purpose. For instance, the first injected fuel masses are multiplied by an enrichment factor A=1.5, which causes a 50% increase in the injected fuel mass. In this way, the fuel portion that, as a wall film, does not directly take part in the combustion is able to be compensated for. This form of the precontrol is advantageous also insofar as the air-fuel ratio λ is not yet ascertainable because a lambda probe has not yet been heated. This is because a determination of the air-fuel ratio λ with the aid of a lambda probe requires a runup time period for the probe during which the lambda probe is heated. But even if very early heating of the lambda probe is already undertaken, for instance when a door handle of the motor vehicle is pulled, this form of a precontrol is advantageous nevertheless because the propagation times of the exhaust gas from the gas burner to the lambda probe have to be taken into account as well. The heating of the lambda probe may also be brought into a temporal context with the heating of the glow plug of the exhaust burner.

To this extent, a request of the driver for the startup of the internal combustion engine is able to be ascertained. Immediately after becoming aware of this request or at a time offset therefrom, the lambda probe and/or the glow plug may already be energized and thus heated. This driver request is able to be specified by

- the operation of the door handle, and also
- by moving/pulling a safety belt, and also
- by pressing, in particular twice, the "open" tab on a remote control of the motor vehicle, and also
- by a corresponding request input with the aid of an app (software application) on a mobile telephone or a 'wearable', and also by operating the 'engine start/stop' switch in the motor vehicle.

The input of the request using the app may especially be the direct input (e.g., the "exhaust burner on" symbol or text) for starting the exhaust burner. This input of the request may be understood by a control device (controller) of the exhaust burner as a 'wakeup' signal, especially within the framework of the onboard diagnosis (OBD), in response to which the lambda probe and/or the glow plug is/are heated. It is therefore advantageous if the means for acquiring the input (i.e., the door handle, seat belt sensor, etc.) is incorporated in the OBD.

Figure 6:
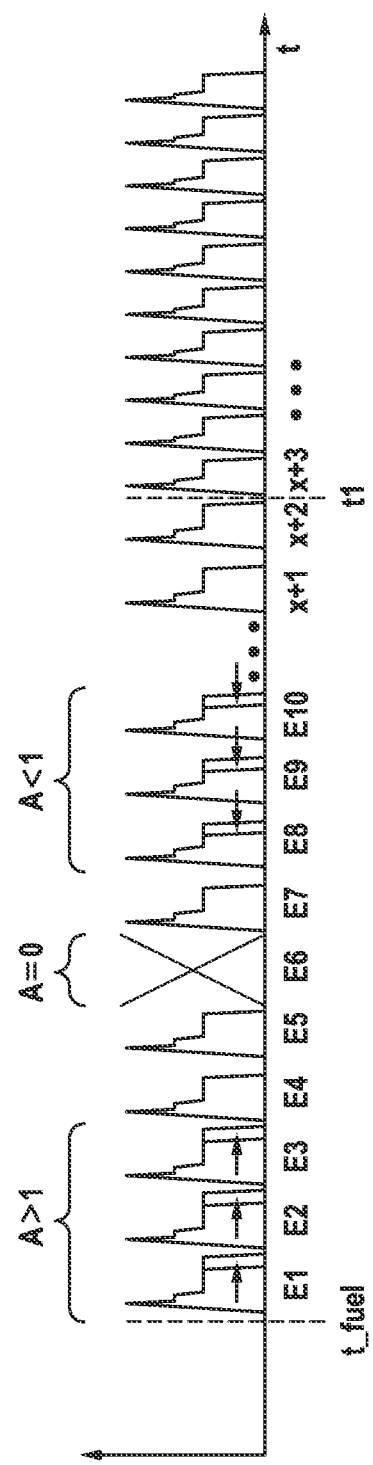
FIG. 6 shows schematically, a chronological detail from FIG. 4, which represents an injection period and enrichment factors for a start phase of the initially cold exhaust burner according to FIGS. 1 and 2.

In FIG. 6, ten injection processes E1 to E10 and not immediately following injection processes x+n are shown. First injection process E1 begins at start-of-injection time t_fuel. Injection process x+3 starts at first time t1. FIG. 6 shows an enrichment factor A>1 by which an increase in the injected fuel mass in a cold exhaust burner is achieved in that the injection period of the first three injection processes E1 to E3 is extended. While the wall film is broken down, an enrichment factor A<1 is specified at a later point of the start process in order to temporarily compensate for the resulting enrichment of the combustion. Such an enrichment factor A<1 is not mandatory, however.

To this extent, a quantity of the fuel is supplied during a time period t1−t_fuel from the start-of-injection time t_fuel to first time t1. The air-fuel ratio $\lambda$ is initially understoichiometric, and then overstoichiometric.

In a further alternative or additional measure, the fuel mass in individual injection processes E6 is multiplied by an enrichment factor A=0, so that no fuel mass is injected. In this way, the specification of the air-fuel ratio $\lambda$ may possibly be reached faster and more precisely. In the exemplary embodiment according to FIG. 6, the sixth injection process E6 was omitted.

As a result, the injection period is varied with the aid of enrichment factor A for the purpose of varying the air-fuel ratio $\lambda$. In a time period between the time periods featuring an understoichiometric and overstoichiometric air-fuel ratio $\lambda$, there is a further time period in which a stoichiometric air-fuel ratio $\lambda$ is specified in that at least one injection process E6 is omitted by setting the enrichment factor A for this injection process E6 to zero.

Further adaptations of a coil ignition system and sparkplug (closing time and thus the ignition energy and spark-burn duration) are already the subject matter of another application but can also be transferred to the aforedescribed method, and will briefly be described in the following text with the aid of FIGS. 7 and 8.

Figure 7:
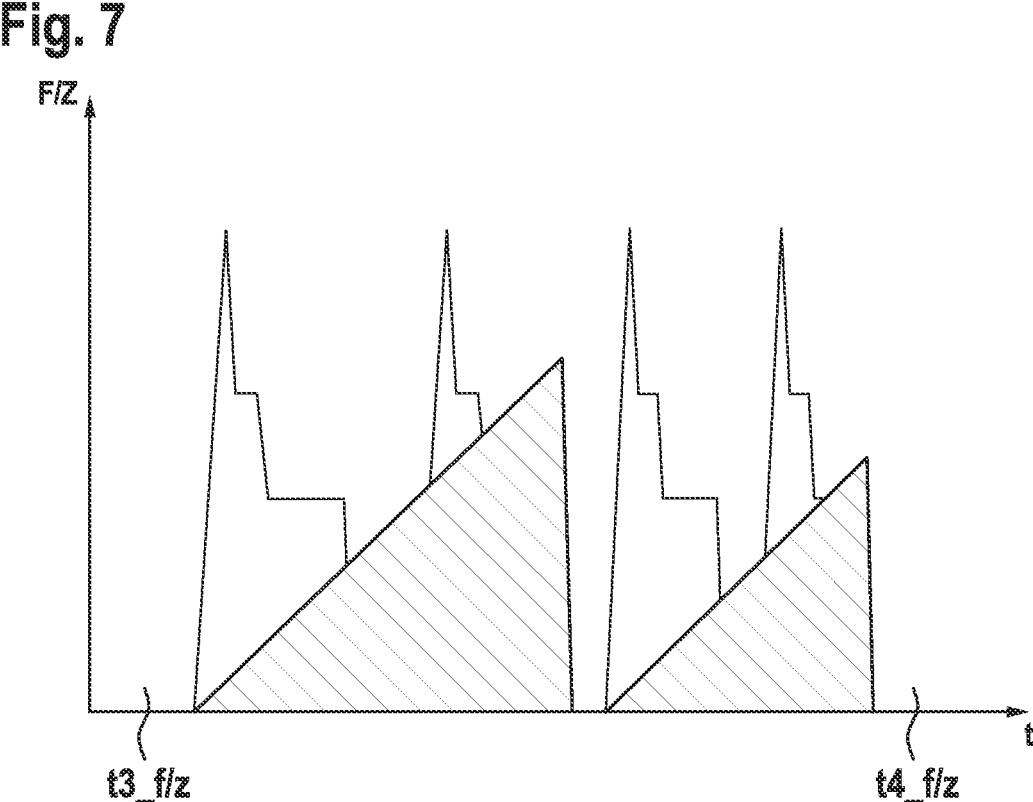
FIG. 7 shows a relationship between an injection frequency and an ignition frequency.

For example, a relationship between the injection frequency and ignition frequency is shown in FIG. 7, the ignition frequency corresponding to one half of the injection frequency in this instance, so that a relatively high spark ignition duration and thus a more reliable ignition results. These frequency relationships may naturally also be combined with one another so that, for example, a lower ignition frequency having correspondingly longer spark burning periods can be adjusted at the beginning of the start phase of the exhaust burner, while a higher ignition frequency may be selected in a later part of the start phase, e.g., for optimizing the burner emissions.

Figure 8:
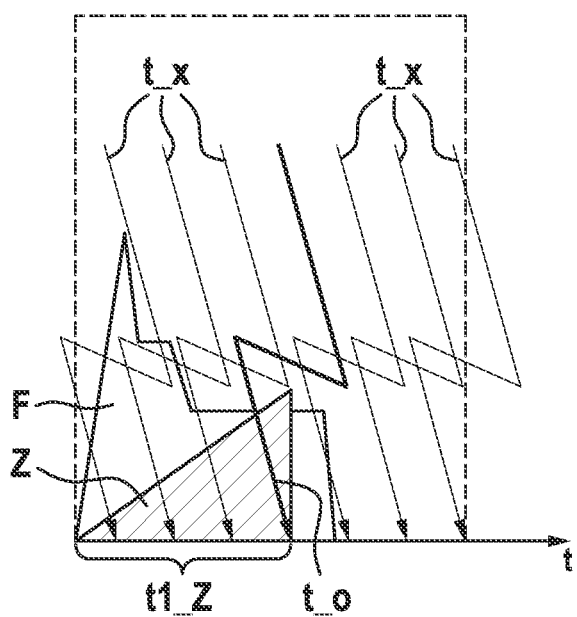
FIG. 8 shows possibilities for adapting the specific moment of ignition.

FIG. 8 shows possibilities for adapting the specific moment of ignition. By shortening or extending closing time t1_Z, the moment of ignition is able to be shifted from an optimum moment of ignition t_o to alternative moments of ignition tx_x. The actual position of the optimal moment of ignition t_o relative to injection F may of course vary, in particular with regard to an optimization goal (such as the flame stability, emission minimization, . . . ) and/or as a function of current operating parameters of exhaust burner 100, e.g., the temperature, air-fuel ratio, etc. A shortening of closing time t1_Z simultaneously reduces the total charge of the ignition coil and thus energy Z available for the ignition.

In addition to the described modifications of the volumetric air flow or air-mass flow, the frequencies for the injection and ignition, the air-fuel ratio, and the enrichment factors, it is also possible to adapt injection pressure p. This adaptation of injection pressure p is described in the following text with the aid of FIG. 9.

Figure 9:
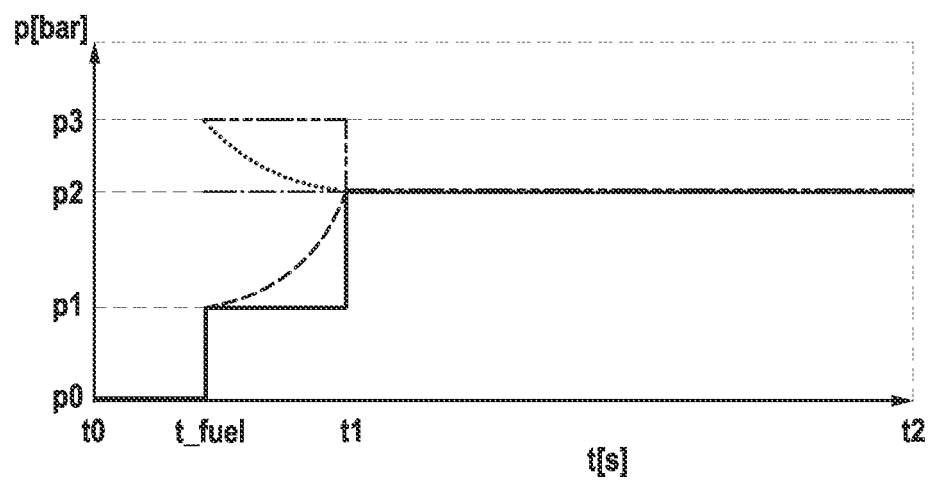
FIG. 9 shows a fuel-injection pressure over the time.

An initial injection pressure p0 is of no relevance because the injection process is enabled at the earliest at first time t1 using injection frequency f_inj=f1. For this reason, a first injection pressure p1 has to be reached no later than first time t1. At second time t2, second injection pressure p2 is modified in comparison with first injection pressure p1. Both a pressure increase and a pressure reduction are possible at second time t2. FIG. 9 shows a pressure increase from first injection pressure p1 to second injection pressure p2.

Injection pressure p is able to be modified both in multiple stages and continually. For illustration purposes, for one, a solid line, which represents an increase in injection pressure p in two stages, is shown in the diagram of FIG. 9. For another, an alternative adaptation of injection pressure p is illustrated with the aid of a dashed curve. The curve represents a steady increase in injection pressure p from first injection pressure p1 to second injection pressure p2.

Two further alternative embodiments may also be gathered from FIG. 9. In these alternative embodiments it is provided that beginning with a start-of-injection time t_fuel featuring a first injection pressure, which is denoted by p3 to be distinguishable in the following text, injection pressure p is steadily reduced or reduced in stages up to first time t1, to second injection pressure p2.

Figure 10:
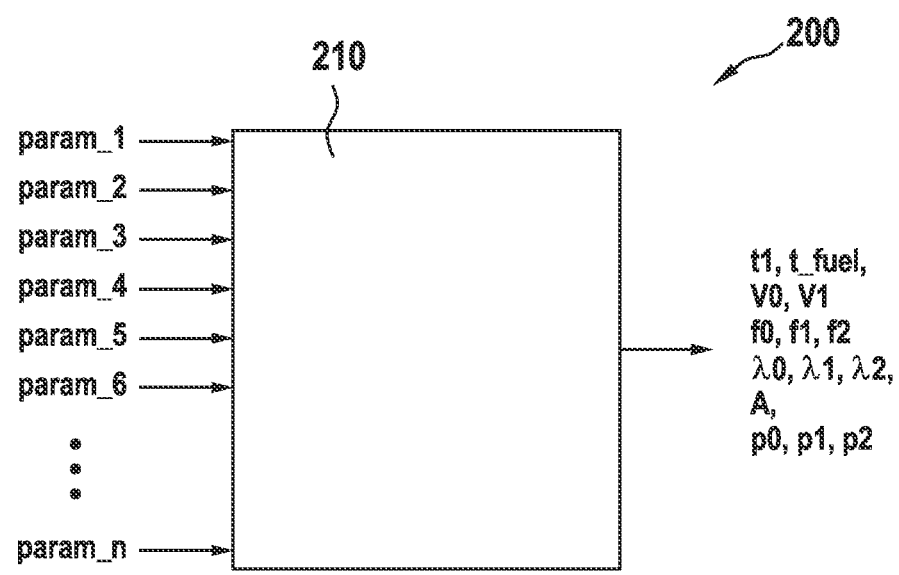
FIG. 10 shows an advantageous example embodiment of a method according to the present invention in a simplified representation.

FIG. 10 shows an advantageous embodiment of the present method in a simplified manner in the form of a block diagram and is denoted by 200 as a whole. Starting parameters of the method are formed by first time t1,
start-of-injection time t_fuel,
volumetric flow V0=zero,
first volumetric flow V1,
frequency possibly amounting to f0=0 Hz,
first frequency f1,
second frequency f2,
air-fuel ratio initial value $\lambda 0$,
first air-fuel ratio $\lambda 1$,
second air-fuel ratio $\lambda 2$,
enrichment factor A,
initial injection pressure p0,
first injection pressure p1, and
second injection pressure p2.

Different input variables param_1 to param_n are taken into account when the output parameters are ascertained. These input variables param_1 to param_n are evaluated in a start coordinator 210 of a control of the exhaust burner, and the output parameters t1, t_fuel, V0, V1, f0, f1, f2, $\lambda 0$, $\lambda 1$, $\lambda 2$, A, p0, p1, p2 are calculated and adapted accordingly. The input variables param_1 to param_n, for instance, involve an outside temperature,
a barometric altitude,
a humidity,
sensor data for evaluating the start, which, for example,
    represent a temperature T within the exhaust burner,
    injection pressure p and the air-fuel ratio $\lambda$, a history of earlier starts or a start adaptation, and/or
parameters from an engine control device, e.g., a battery voltage, a current drive motor speed, a throttle valve setting, a fuel-injection pressure, a lambda request, and/or differential pressures of the exhaust system, for instance at the soot particulate filter (GPF), and
a fuel specification.

Figure 11:
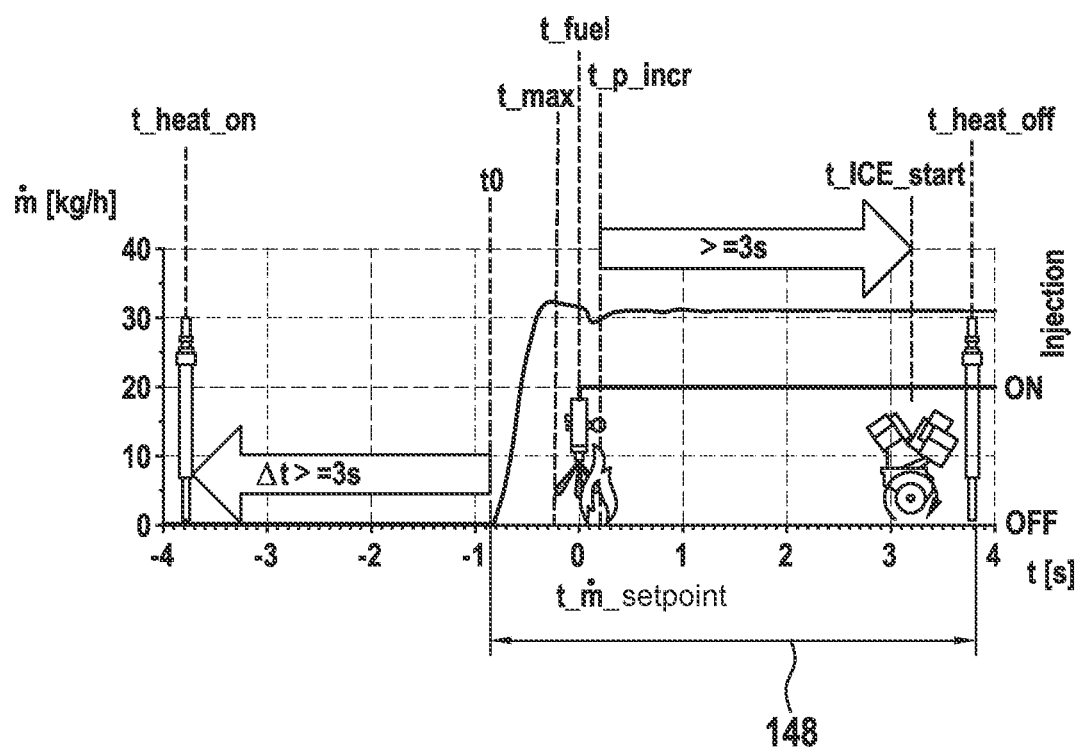
FIG. 11 shows, based on a diagram, a further exemplary embodiment of an exhaust burner for a gasoline engine, in which the time period prior to a start time of the air-mass flow is shown as well.

FIG. 11, with the aid of a diagram, shows another exemplary embodiment of a method for operating an exhaust burner of an exhaust system of a gasoline engine, the diagram also showing time period Δt ahead of start time t0 with the starting air-mass flow ṁ0. Period Δt thus lies before start phase 148. At a pre-glow start time t_heat_on, the glow plug is supplied with a voltage that causes a rising temperature at the glow plug. Pre-glow start time t_heat_on lies at least three seconds before start time t0 featuring starting air-mass flow ṁ0, that is, Δt>=3 s. Beginning with start time t0, air-mass flow ṁ is increased in a strictly monotonic manner until it has reached an air-mass flow of approx. 32 kg/h as a maximum value at a maximum time t_max. Next, gasoline is injected into the combustion chamber of the exhaust burner, which is ignited at the glow plug so that at a following pressure-increase time t_p_incr, the rise in the pressure in the combustion chamber is sensed with the aid of a pressure sensor, which is not shown in greater detail. The gasoline is therefore supplied for the first time after the glow plug has been heated at start-of-injection time t_fuel, which follows an attainment of a maximum value of air-mass flow ṁ1. After a time period of at least three seconds following pressure-increase time t_p_incr, the gasoline engine is started up at a start-up time t_ICE_start, so that the crankshaft of the gasoline engine is rotating. After start-up time t_ICE_start, the voltage at the glow plug is reduced at a switch-off time t_heat-off, or reduced to zero.

The curve in the diagram of FIG. 11 represents a much "more realistic" curve of the air runup or the increase in air-mass flow ṁ in relation to the curve in the diagram of FIG. 3. In contrast to the description in FIG. 4, the start-of-injection time t_fuel according to FIG. 11 occurs only after first time t1. It should therefore be noted that the transition to a stationary operation need not necessarily take place exactly at first time t1 as in the case of the air mass. A switchover of injection frequency f may ultimately also take place at a later time, in a deviation from first time t1, because the air is still "settling" at the maximum value of air-mass flow ṁ1. First time t1 shown in FIG. 4, FIG. 5 and FIG. 9 may thus also occur at a different time t than shown in FIG. 3, especially under real conditions.

In reality, the time period from start time t0 to first time t1 amounts to approximately t<200 ms to t=1 s. In contrast, the time period from first time t1 to second time t2 amounts to several seconds, for instance three seconds.

What is claimed is:

1. A method for operating an exhaust burner, which is situated in an exhaust system downstream from an internal combustion engine of a motor vehicle, the method comprising:
 prior to and during a start phase of the exhaust burner, increasing an air-mass flow supplied to a combustion chamber of the exhaust burner strictly monotonically, between:
  a start time in a starting air-mass flow, and
  a further time in a further air-mass flow,
  and prior to the further time, fuel being conveyed to the combustion chamber, a fuel-air mixture being produced in the combustion chamber from the fuel and air of the air-mass flow, and the fuel-air mixture is ignited using an ignition device which is continuously hot or produces an ignition spark intermittently.

2. The method as recited in claim 1, wherein the fuel is gasoline, which is supplied to the exhaust burner for a first time after heating of a glow plug as an ignition device at a start-of-injection time, which occurs after a maximum value of the further air-mass flow has been reached.

3. The method as recited in claim 1, wherein the fuel is conveyed to the exhaust burner at a start-of-injection time, which lies between the start time and the further time.

4. The method as recited in claim 1, wherein the fuel is injected into the combustion chamber of the exhaust burner using an injection valve at an injection frequency, and the fuel is injected at a first injection frequency at the start-of-injection time, and at a second injection frequency at the further time.

5. The method as recited in claim 4, wherein the injection frequency is kept constant during a time period from the start-of-injection time until the further time.

6. The method as recited in claim 4, wherein the injection frequency is steadily increased during a time period from the start-of-injection time until the further time.

7. The method as recited in claim 4, wherein the injection frequency is reduced starting with the further time.

8. The method as recited in claim 1, wherein an air-fuel ratio is steadily increased in a stepwise or continual manner from the start-of-injection time to the further time so that starting from a first air-fuel ratio at the start-of-injection time, a higher second air-fuel ratio is achieved at the further time.

9. The method as recited in claim 8, wherein the second air-fuel ratio is kept constant up to a second time which is after the further time, and a time period from the start time to the further time is shorter than a time period from the further time to the second time.

10. The method as recited in claim 8, wherein the combustion chamber is supplied with a quantity of fuel during a time period from the start-of-injection time to the further time, and the air-fuel ratio is initially understoichiometric and then overstoichiometric.

11. The method as recited in claim 10, wherein an injection period is varied using an enrichment factor for a variation of the air-fuel ratio, and a further time period lies in a time period between the time periods featuring an understoichiometric and overstoichiometric air-fuel ratio, in which a stoichiometric air-fuel ratio is specified in that at least one injection process is omitted by setting the enrichment factor for the injection process to zero.

12. The method as recited in claim 1, wherein the air-mass flow is kept constant starting with the further time up to a second time, and a time period from the start time to the further time is shorter than a time period from the further time to the second time.

13. The method as recited in claim 1, wherein the method is carried out as a function of a specified request by the driver of the motor vehicle for a start-up of the internal combustion engine, and, as a function of a specification of the request, a lambda probe of the exhaust system is heated and/or the ignition device which is a glow plug is heated.

14. A device, comprising:
 an internal combustion engine; and
 an exhaust system including an exhaust burner situated downstream from the internal combustion engine, the exhaust burner having a combustion chamber and a glow plug as an ignition device, by which a fuel-air mixture inside the combustion chamber of the exhaust burner is able to be ignited;

wherein the device is configured to operate the exhaust burner by:
  prior to and during a start phase of the exhaust burner, increasing an air-mass flow supplied to a combustion chamber of the exhaust burner strictly monotonically, between:
    a start time in a starting air-mass flow, and
    a further time in a further air-mass flow,
and prior to the further time, fuel being conveyed to the combustion chamber, a fuel-air mixture being produced in the combustion chamber from the fuel and air of the air-mass flow, and the fuel-air mixture is ignited using an ignition device which is continuously hot or produces an ignition spark intermittently.

15. A motor vehicle, comprising:
a device, including:
  an internal combustion engine; and
  an exhaust system including an exhaust burner situated downstream from the internal combustion engine, the exhaust burner having a combustion chamber and a glow plug as an ignition device, by which a fuel-air mixture inside the combustion chamber of the exhaust burner is able to be ignited;
wherein the device is configured to operate the exhaust burner by:
  prior to and during a start phase of the exhaust burner, increasing an air-mass flow supplied to a combustion chamber of the exhaust burner strictly monotonically, between:
    a start time in a starting air-mass flow, and
    a further time in a further air-mass flow,
and prior to the further time, fuel being conveyed to the combustion chamber, a fuel-air mixture being produced in the combustion chamber from the fuel and air of the air-mass flow, and the fuel-air mixture is ignited using an ignition device which is continuously hot or produces an ignition spark intermittently.

* * * * *